July 28, 1970  R. R. BUCKLER  3,521,813
PUNCHED CARDS AND METHODS FOR FORMING SUCH CARDS
Filed Sept. 7, 1966  8 Sheets-Sheet 1

INVENTOR
RAYMOND R. BUCKLER
BY
Watson, Cole, Grindle + Watson
ATTORNEYS

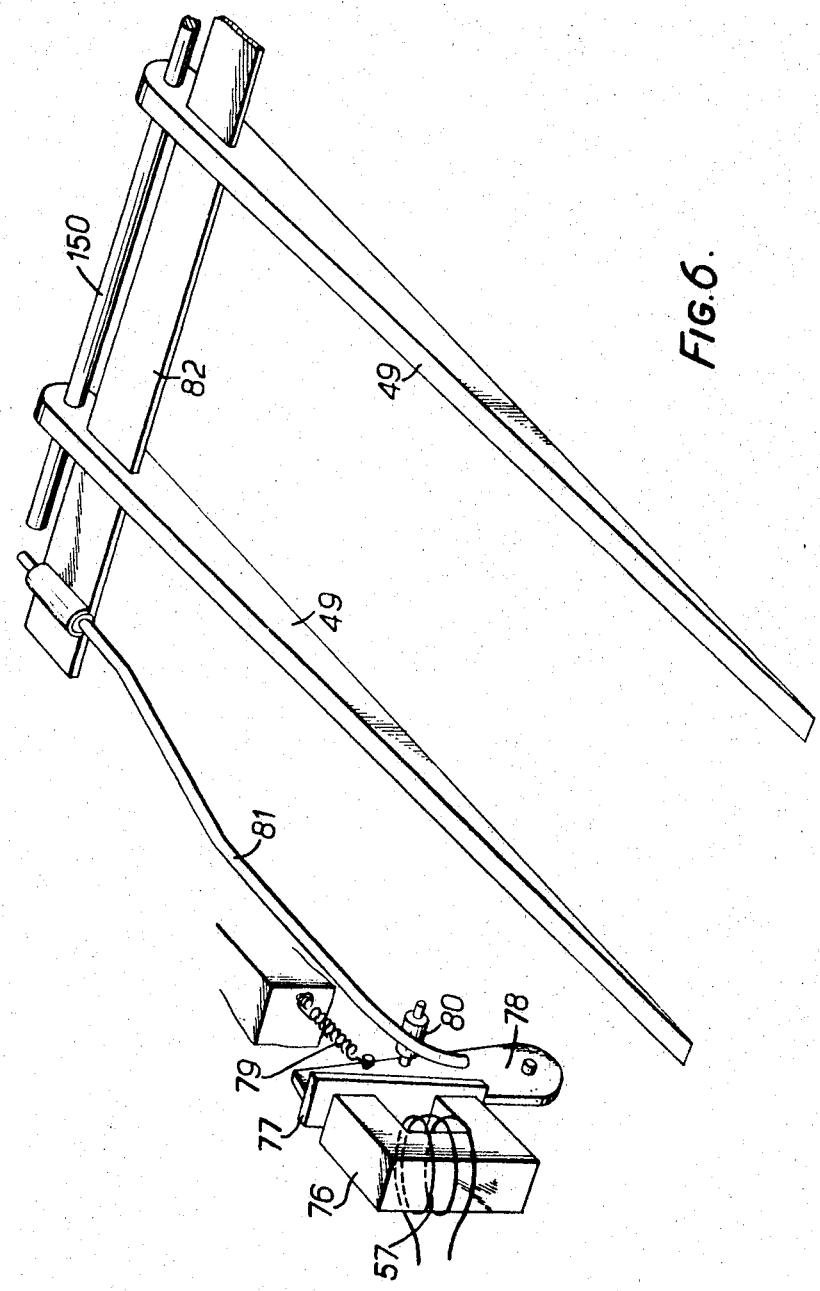

July 28, 1970  R. R. BUCKLER  3,521,813
PUNCHED CARDS AND METHODS FOR FORMING SUCH CARDS
Filed Sept. 7, 1966  8 Sheets-Sheet 7

DATA SHEET 556A1
TYPICAL RANGES OF X/R (50 C/S SYSTEMS)

| COMPONENT | VOLTAGE (KV) | RANGE OF X/R | REMARKS |
|---|---|---|---|
| GENERATORS ALONE | 11-15 | 30-120 | GENERALLY LARGE GENERATORS AT HIGH X/R BUT THESE ARE USUALLY COMBINED WITH TRANSFORMERS |
| GENERATOR TRANSFORMERS | 11 OR 15/ 132-275 | 20-40 | LARGE GENERATORS FOR TRANSMISSION |
| TRANSFORMERS FOR TRANSMISSION AND PRIMARY DISTRIBUTION | 275/66-132 132/66 66/6-33 | 30-35 | VALUE DEPENDS ON % REACTANCE REQUIRED FOR SYSTEM REASONS |
| TRANSFORMERS FOR DISTRIBUTION | 3.3-33 | 5-10 | REACTANCE VALUES KEPT LOW FOR REGULATION REASONS |
| REACTORS | | 30-120 | DEPENDS ON THROUGHPUT AND ECONOMIC DESIGN OF LOSSES |
| CABLES | 3.3-6.6 11-22 33-132 275 | 0.16-1.0 0.2-2.0 1.0-5.0 2.0 | LARGELY DEPENDS ON RATED CURRENT. LARGER VALUES TEND TO BE OBTAINED WITH LARGE SLOT FOR SINGLE CORE TYPES |
| OVERHEAD LINES | 11-22 33-66 132 275 400 | ¼-2½ 1½-3 2 4 9 9 15 | (DEPENDS ON RATED CURRENT) 2×.175 IN² CONDUCTORS 2×.4 IN² CONDUCTORS 2×.4 IN² CONDUCTORS 2×.4 IN² CONDUCTORS |

*FIG. 7.*

INVENTOR
RAYMOND R. BUCKLER
BY
Watson, Cole, Grindle & Watson
ATTORNEY

United States Patent Office 3,521,813
Patented July 28, 1970

3,521,813
PUNCHED CARDS AND METHODS FOR FORMING SUCH CARDS
Raymond Robert Buckler, Hebburn, Durham, England, assignor to A. Reyrolle & Company Limited
Filed Sept. 7, 1966, Ser. No. 577,752
Int. Cl. G06k 1/02, 19/06
U.S. Cl. 234—1                                 9 Claims

ABSTRACT OF THE DISCLOSURE

A card having areas of graphic record thereon is punched with data holes smaller than the size of at least the majority of the significant details of the graphic record, so as not to obscure such details. Certain areas of the card may be selected to be kept free of perforations where such perforations might obscure significant details of the graphic record. Apparatus is provided to read and sort such cards.

---

Figure 1:
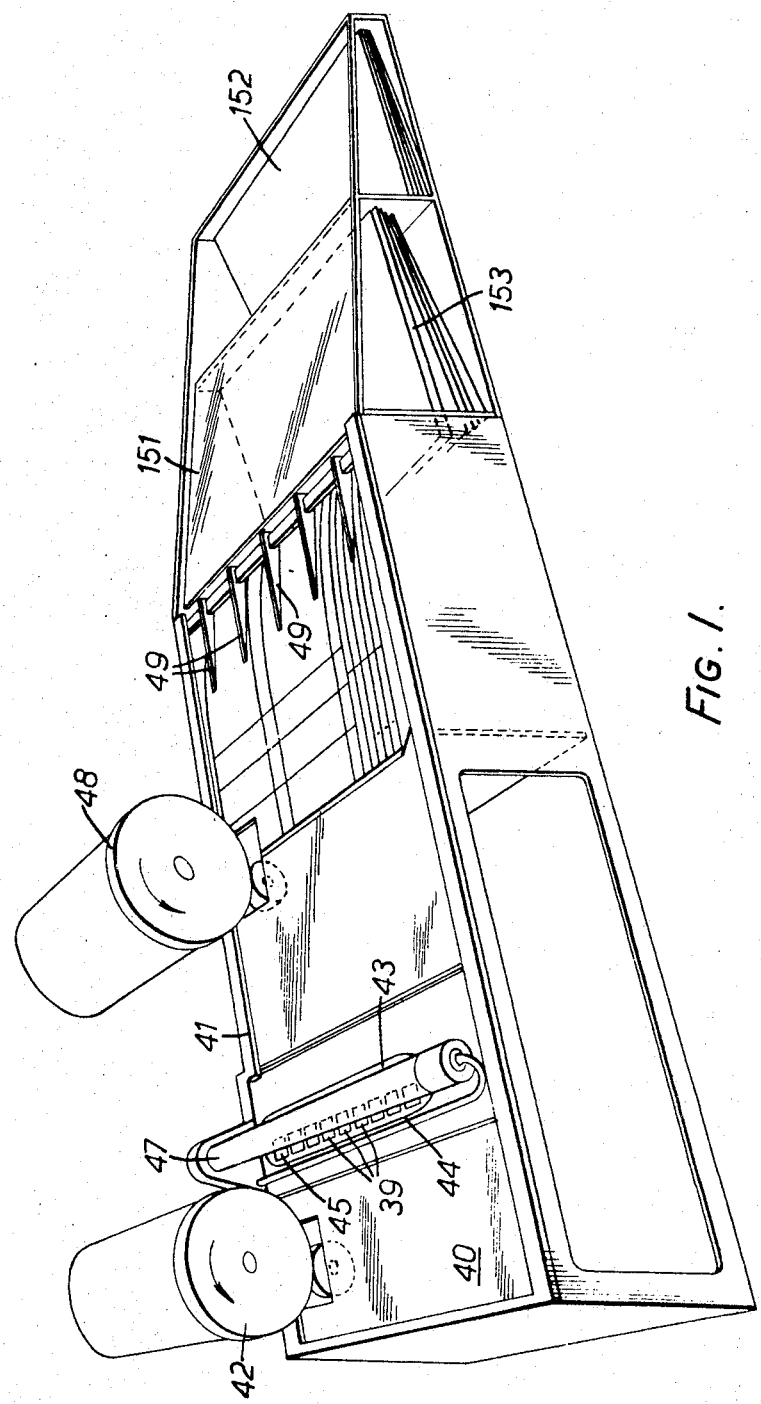

This invention relates to punched cards having holes, perforations, or other apertures formed therein at selected positions representing coded information.

It is an object of the invention to provide an improved punched card which simultaneously carries a graphic record, for example letterpress, diagrams, handwriting, columnar accounts or records, or photographic records.

Previously it has been proposed to provide punched cards which also carry a graphic record, but known cards of this type have been subject to certain limitations. Obviously there is a risk that the holes in the card may obscure some important parts of the graphic record. To overcome this, some prior punched cards have adopted preselected segregated areas for the graphic record and for the perforations. In another prior proposal the holes have been confined to an area in which the graphic record is deliberately presented in symbols of an enlarged size, so that even if there is overlap between a symbol and a hole the symbol is not obscured. It has also been proposed to form the holes in the card prior to adding the graphic record, which is then positioned deliberately between the holes, or in unperforated areas.

None of these prior proposals has been applicable to the use of a card which carries over substantially its whole area a graphic record in normal small-size legible writing, for example ordinary typescript, letterpress or handwriting. On such cards, there is no preselected area devoid of graphic record (apart from limited areas between lines of writing, or around margins) where the holes can be formed, and if holes are formed over the area of the graphic record it is possible and even likely that vital information may be obscured.

It is an object of the present invention to provide an improved punched card or punched card system in which some of these disadvantages and limitations are overcome, and from one aspect the invention consists in a punched card with small holes formed in areas coinciding with or overlapping areas of graphic record on one or both surfaces of the card.

The term "small" as used above is to be interpreted as meaning that the size of the holes is somewhat smaller than the size of at least the majority of the significant details of the graphic record, for example symbols such as letters or numerals, in the areas where the holes overlap with the graphic record. However the size of the holes is not necessarily smaller than all of the significant detail or symbols used in the graphic record in the overlap area. For example full stops or decimal points would be of very much smaller size than the majority of other symbols and the punched holes would not necessarily be of smaller size than these very small points.

The holes are conveniently circular in shape, though to compensate for non-uniform sensitivity of a sensor used for card sorting, other shapes, such as elongated holes may be preferred. The minimum permissible spacing of the holes will depend upon the spacing of the sensers in a sorting machine, and on the required mechanical strength of the card, and should be at least as great as the size of the individual holes.

In practice, in the case of a graphic record consisting of printed letterpress, the smallest size of letter which can be read at all easily is approximately 2 mm. in height in a lower case letter with an ascender, such as "t" and 1.5 mm. in a lower case letter without an ascender or descender, such as "o." Corresponding letters in "6 point" having respective vertical heights of 1.5 mm. and 1.0 mm. can be read with some care and attention but below this size the writing becomes difficult to read. Thus when using circular holes in conjunction with small size letterpress the size of the punched apertures in the card is preferably smaller than 2 mm. and a convenient size is 1.0 mm. The lower limit for the hole size will depend on the characteristics of the device used to detect the holes and corresponding properties of the card, e.g. if photocells are used their sensitivity, the intensity of the light source, and the opacity of the card will be involved. The determining factor in practice, however, may often be the difficulty of punching very small holes cleanly and/or of keeping them clear of foreign matter after punching. It appears that a practical lower limit may be 0.5 mm.

By using such small holes the required coded patterns of holes can often be distributed at random or at will over virtually the whole area of the card regardless of the position and distribution of the graphic record. If, however, the graphic record contains essential detail that is of smaller size than the rest, and is so small that it could be obscured or made indistinguishable by the holes, e.g. decimal points, certain areas of the card can be marked or otherwise selected to be kept free of perforations. The method of punching the cards and the sorting apparatus for use with the punched cards is designed to allow the perforations to be suitably positioned if necesary to avoid such areas. Thus the perforations are conveniently formed in rows across the card, the positions of the perforations in each row being determined by a selected coding system so that each row records one or more complete items of information. Each row is referenced to a base line extending perpendicular to the direction of the rows, and this base line is conveniently an edge of the card. The sorting apparatus is made capable of "reading" each row of apertures as the card passes across the reader in a direction parallel to the base line. The position of any particular row in this direction is then of no consequence to the sorting apparatus and accordingly the rows can be positioned so as to avoid any areas of the graphic record in which the holes could obscure or obliterate essential detail of the record.

Thus from another aspect of the invention a punched card sorting machine comprises a number of aperture sensing devices spaced across the machine transversely to the direction of travel of the cards, means for passing a punched card continuously across the sensing devices, a gate for directing the card into a selected discharge position, actuator means for controlling the position of the gate in accordance with the signals received from the sensing devices and selector means associated with the actuator means for determining what combination(s) of signals from the sensing devices will cause the actuator means to move the gate from one predetermined position to another. The sensing devices are preferably sensitive to light or other radiation, such as photocells, and are conveniently arranged in a row.

There may be an extra sensing device for resetting the gate after the passage of a card through the gate or on the arrival of a succeeding card at the sensing devices, and a further senser for detecting an "erase" notch or aperture and rendering the actuator means inoperative. The machine may also include a lateral or inclined drive to hold a reference edge on each card against a corresponding locating surface on the machine.

Another feature of the invention resides in a method of forming punched cards by punching small holes in patterns on cards previously provided with a graphic record over part of, or the whole of, one or both surfaces, the positions of the holes in each pattern being selected from a common pattern of predetermined positions relative to a reference line on each card and, in the case of a card bearing a plurality of patterns, the patterns being displaced relative to each other in the direction of the reference line, the position(s) of the pattern(s) along that direction being selected for each card individually from part of or the whole length of the card, with at least part of the perforated area overlapping part of the graphic record.

The invention also resides in a set of punched cards when formed by the method defined immediately above.

Another feature of the invention consists in a method of storing and recovering data by use of punched cards which carry items of graphic record on at least one surface, in which each card, after having been previously printed or otherwise marked with the graphic record, is punched with groups of small holes representing coded items of information corresponding to the graphic record on the card. The groups of holes extend transversely across the card and the perforated areas coincide with or overlap areas of the graphic record, and each group represents a distinct item of information. The punched cards are subsequently sorted in a machine having means for passing the cards lengthwise across a number of sensing devices spaced transversely to the direction of movement, and selector means are actuated by the sensing devices for selecting cards having particular combinations of hole positions.

One particular convenient coding system for determining the positions of the holes involves separating a complete row of possible hole positions into a number of equal or different sized groups and then punching a selected number of holes in each group. For example if each group contains seven possible positions and three holes are punched in each group there are thirty five different possible combinations in each group. This allows any one of the twenty six letters of the alphabet or of the numerals 1 to 9 to be represented in each group, the letter O being used for zero so that each letter or numeral can be represented by a unique pattern of three holes. Many other coding systems can of course be used, the coding system itself forming no part of the present invention.

Figure 2:
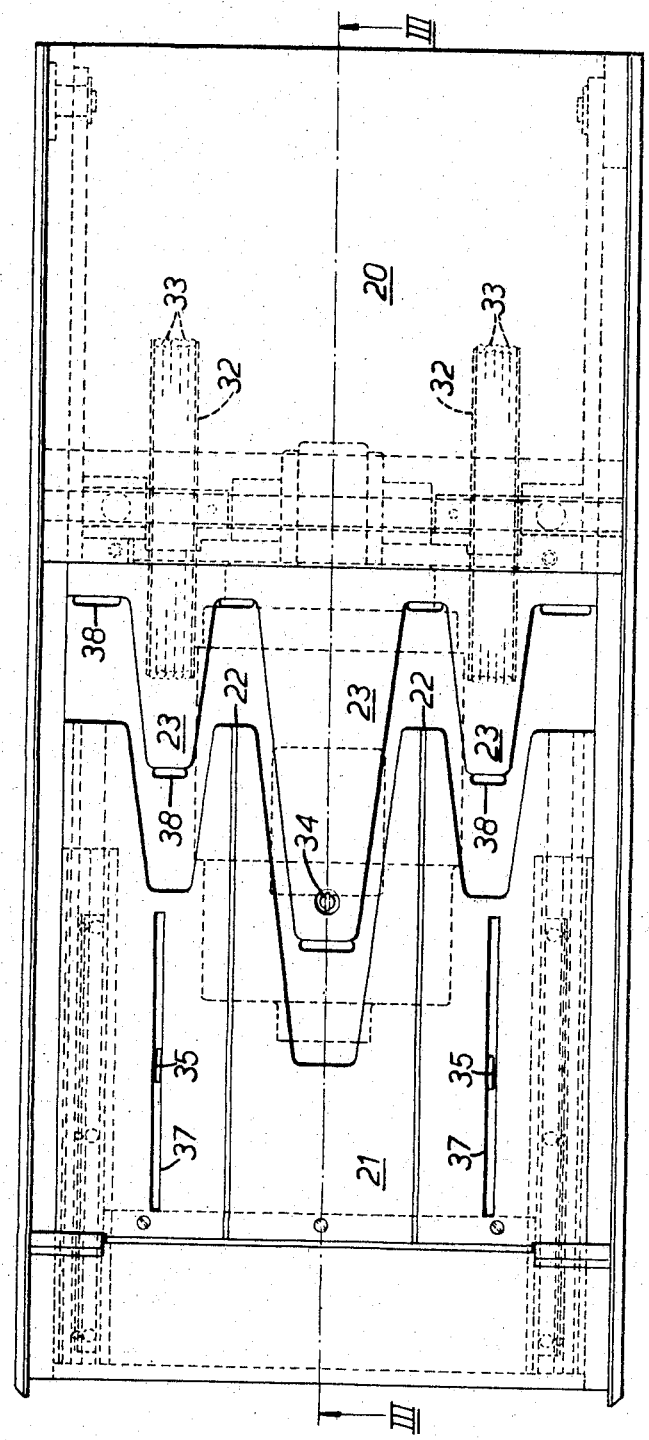
Figure 3:
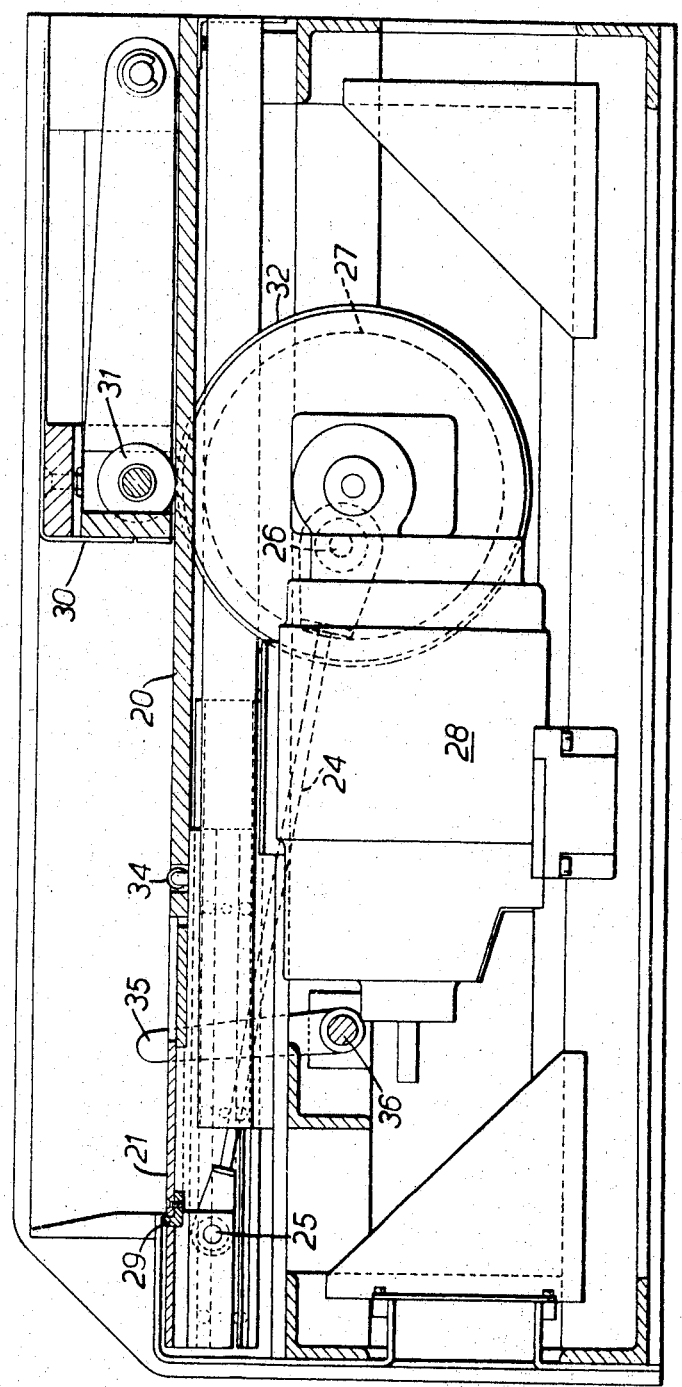
Figure 4:
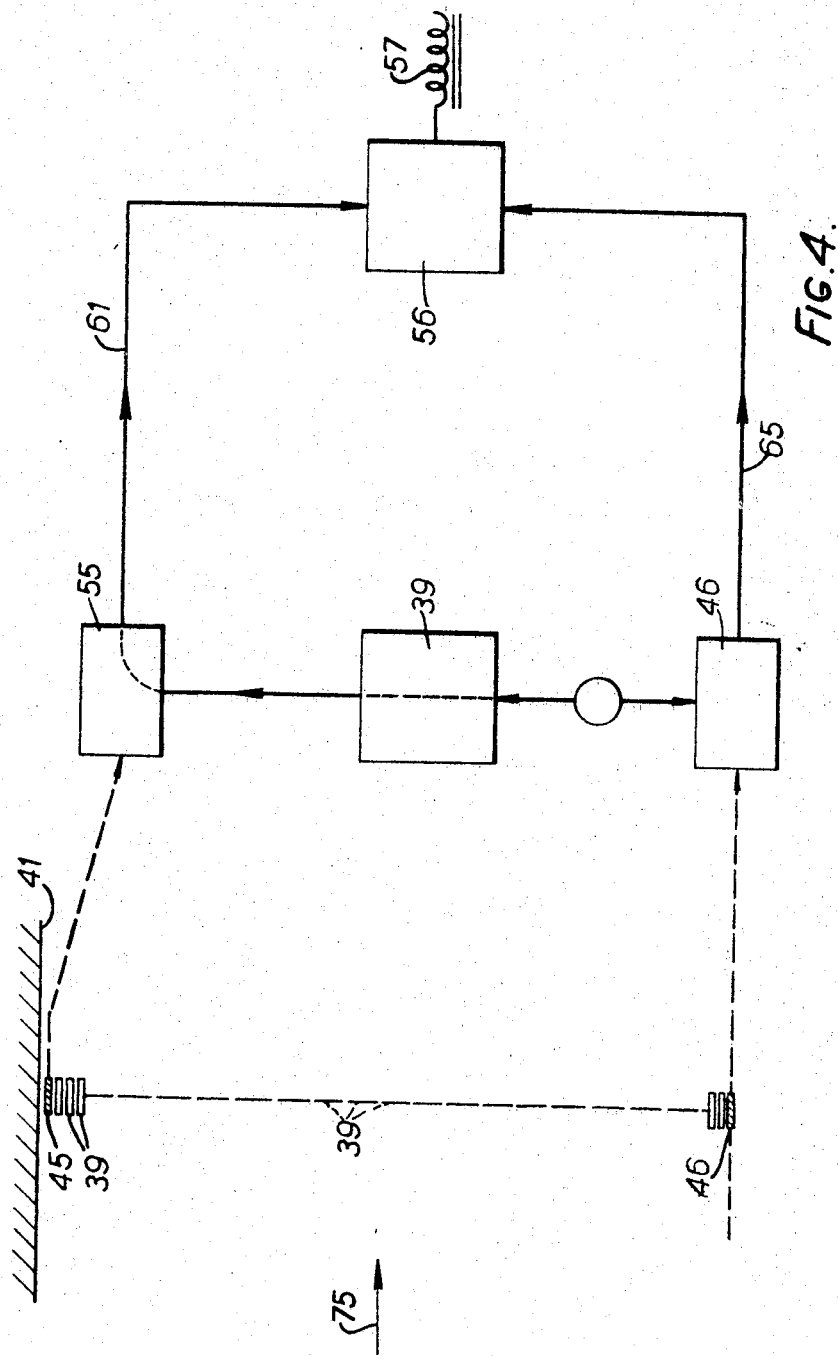
Figure 5:
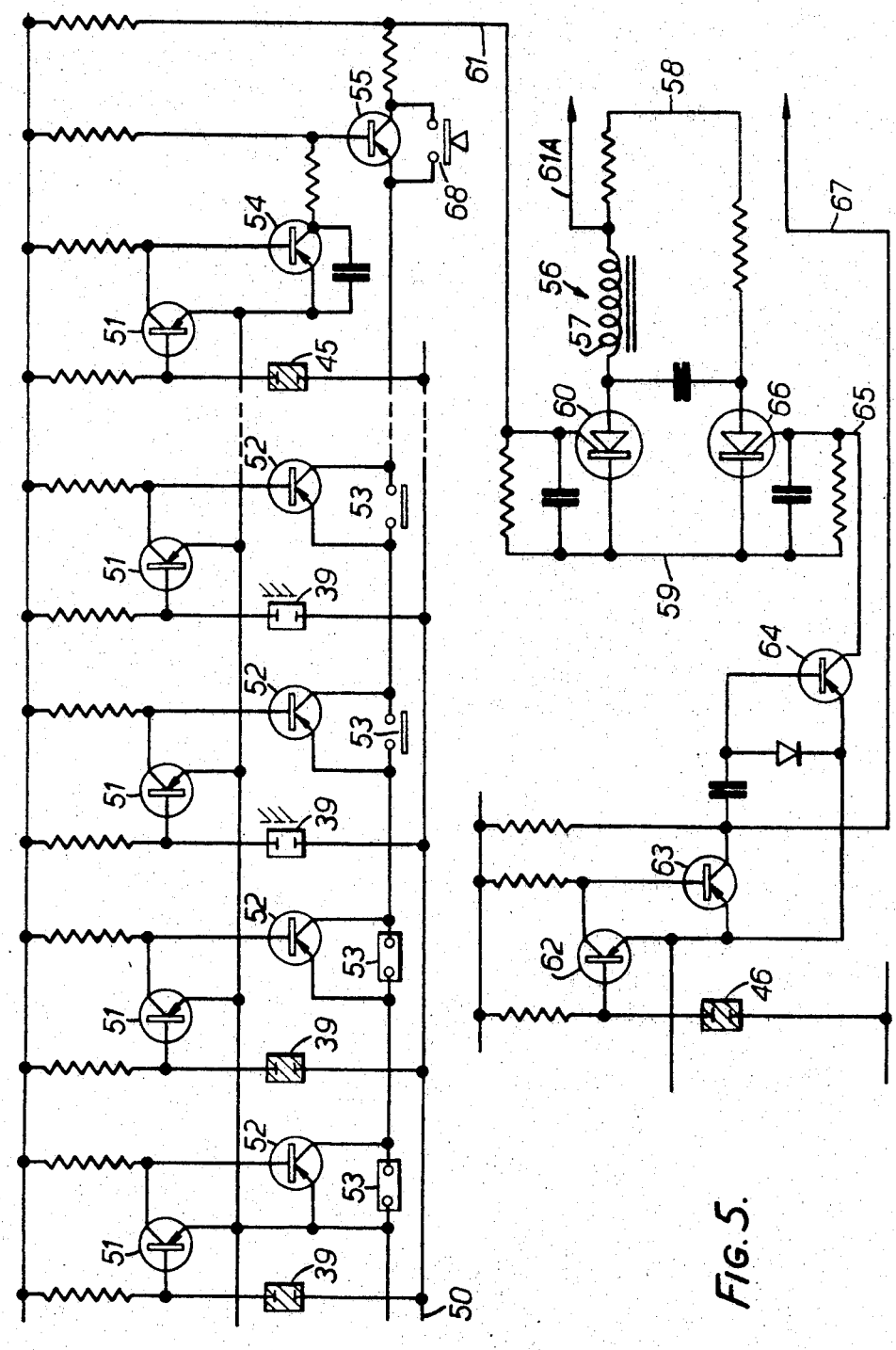
Figure 8:
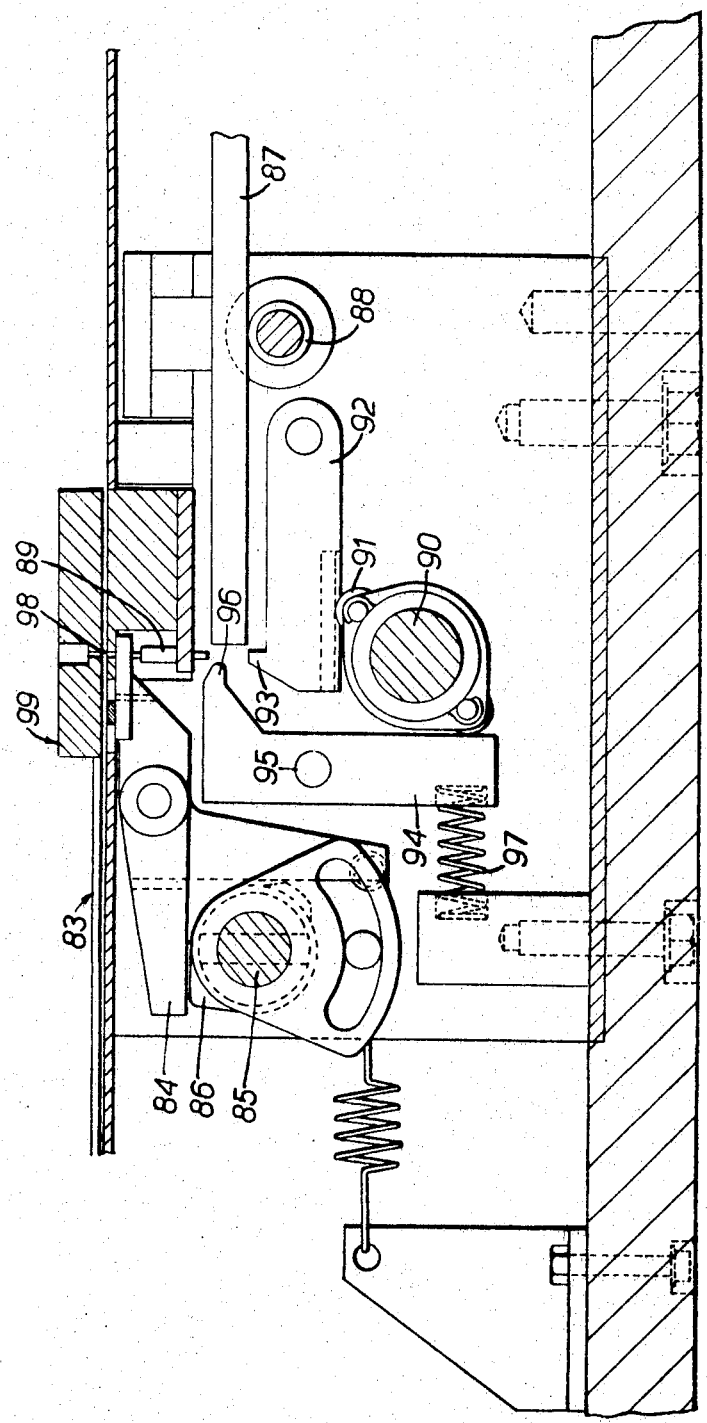

The invention may be performed in various ways and one specific embodiment with a number of possible modifications thereof will now be described by way of example with reference to the accompanying drawings, in which:

FIG. 1 is a general perspective view of a card sorting machine according to the invention, with the card feeder unit and the selector deck omitted for convenience, FIG. 2 is an enlarged plan view of the card feeder unit which is positioned physically on the left of the machine illustrated in FIG. 1, FIG. 3 is a sectional side elevation through the card feeder unit on the line III—III in FIG. 2, FIG. 4 is a schematic diagram illustrating the function of the main components of the electrical circuit, FIG. 5 is a more detailed circuit diagram illustrating the sensing photocells, the erase photocell and the gate actuating circuit, FIG. 6 is a somewhat diagrammatic illustration of the gate actuating mechanism, FIG. 7 is a representatioin of a specimen punched card in accordance with the invention, and FIG. 8 is a sectional side elevation through a punching unit for punching cards.

Referring first to the card illustrated in FIG. 7, it will be noted that the card bears a format of ruled columns with printed headings, into which columns data relating to particular components are typewritten. Alternatively, the details may be written in manuscript. The card may also include symbols and drawings and the visible graphic information may be applied to both faces of the card. One edge of the card indicated at 10 is the reference edge and a line of indexing marks 11 is provided on the card parallel to this reference edge. This line of marks may be included in the initial printed format or may be applied subsequently. The indexing marks are spaced apart at equal intervals, the spacing in the present example being approximately ¼". These indexing marks provide guidance for positioning the rows of punched holes.

Before holes are punched in the card the card is inspected visually for areas of the graphic record which are of particular importance, or where the size of the individual symbols or letters in the graphic record is small in relation to the size of the holes to be punched so that significant detail of the record might be obscured or obliterated by the punched holes. In the card illustrated in FIG. 7 it may be noted that important detail occurs in the decimal points and fractions included in the lower two blocks of the column headed "Range of X/R" and also in the small size numerals contained in the lowest block in the column headed "Remarks." The operator, before punching the card, accordingly marks "danger signs" in the form of crosses 12 adjacent the row indexing marks 11 and aligned laterally with the selected significant details. These crosses indicate the areas where holes should not be punched in the card. Alternatively with some forms of graphic record, e.g. letterpress or handwriting, it may be more practicable to punch the holes without previously looking for such detail, and then to examine the graphic record in the punched area after punching, to find any parts of it that have been made indecipherable, such parts then being reproduced in some other suitable positions on the card or possibly the whole card being reproduced with the offending row(s) of holes put in a different position on the card.

The top edge 13 of the card illustrated in FIG. 7 will be referred to as the leading edge and the bottom edge 14 as the trailing edge. In the subsequent punching operation holes are punched in the card in rows parallel to the leading edge, the rows being aligned approximately with the row of indexing marks 11. However this spacing not compulsory and the spacing between the rows can be varied by the operator, particularly to avoid the crosses 12 if necessary. Each row of holes has fifty five possible holes positions spaced along the row at intervals of $\frac{1}{10}$" from a first position spaced $\frac{3}{16}$" from the reference edge 10. Each hole is circular and has a diameter of 1.0 mm. The hole position at the opposite end of each row is spaced approximately 3" from the opposite edge 15 of the card and this provides a strip approximately 3" wide which will be free of perforations. Accordingly, if the card is of a type in which information is applied to the card after printing, this strip, indicated generally at 16, affords an area where a graphic record containing a high proportion of small detail can be inserted.

Alternatively, the area may be used for punching holes or applying other means for controlling a machine such as an automatic typewriter.

Each row of punched holes represents one or more complete items of information which is extracted from or related to the graphic record on the card. The coding system employed forms no part of the present invention and need not be described. A suitable punching machine for performing the punching operation will be described in detail with reference to FIG. 8.

In the specimen card illustrated in FIG. 7, one row of holes indicated at 17 has been incorrectly punched. In order to "erase" this row of holes an "erase" notch 18 is punched in the reference edge 10 in alignment with this row 17. The effect of this erase notch on the sorting apparatus will be described below.

The sorting apparatus for use with these punched cards is illustrated in FIGS. 1 to 6. A stack of punched cards is placed on the feeder unit illustrated in FIGS. 2 and 3, and positioned at the left hand side of the sorting unit illustrated in FIG. 1 and the cards are then delivered through a scanning unit to a gate which directs the cards appropriately to selected positions.

The feeder unit illustrated in FIGS. 2 and 3 comprises a stationary table 20 and a reciprocating table 21, the two tables having interengaging tongues 22, 23 affording a zig-zag separating gap to avoid buckling the cards. The reciprocating table 21 is slidable horizontally on guides and is actuated by a connecting rod 24 pivotally attached at 25 to the table and at 26 to an eccentric point on a driving wheel 27 driven by a motor 28. Thus as the wheel 27 rotates the moving platform 21 reciprocates horizontally. At its left hand edge the table 21 is provided with a shallow upstanding lip 29 whose vertical height is equal to or slightly less than the thickness of the cards in the stack. Above the stationary table 20 there is provided a vertical stop plate 30 whose lower edge is spaced above the surface of the table 20 by a small clearance which is slightly greater than the thickness of a card but less than the thickness of two cards. To the right of the abutment plate 30 a pair of small wheels 31 are arranged to bear against the surfaces of two driving wheels 32 also driven by the motor 28. The driving wheels 32 may be provided with rubber driving bands 33 around their periphery and the relative position of the wheels 31 is such as to nip a card passing between each pair of wheels 31, 32.

Thus in operation, when a stack of cards is placed on the tables 20, 21 and the motor is started, the movement of the table 21 to the right shifts and whole stack up against the abutment plate 30. Further movement of the table 21 causes the raised lip 29 to push the bottom card of the stack through the gap between the fixed table 20 and the lower lip of the abutment plate until the leading edge of the card is engaged by the wheels 31, 32. The card is then driven forward, i.e. to the right in FIG. 3, into the sorting unit.

The feeder unit also includes a small roller 34 set in an aperture in the stationary table 20 so as to be movable vertically against a spring and connected to a microswitch (not shown). The spring setting is so adjusted that if there is an adequate number of cards in the stack to provide the required weight and ensure a clean exit the microswitch will be closed. If the number of cards is insufficient to provide adequate weight the spring will raise the roller 34 and the microswitch will open to stop the driving motor 28. The operator may then apply weight to the cards or insert an additional stack. The feeder unit also includes a pair of levers 35 pivotally mounted on a cross shaft 36 which is connected to a manual operating lever, not shown, the levers 35 being aligned with slots 37 in the moving table 21. The levers 35 normally lie below the surface of the moving table 21 but by turning the shaft 36 the levers can be raised to the position shown in FIG. 3 to assist in removing cards from the table if that should be desired. Holes 38 are provided in the stationary table 20 to allow foreign matter to be cleaned from the table 21.

It will be noted that the moving table 21 will reciprocate with approximately simple harmonic motion and the leading edge of the bottom card will engage between the wheels 31 and 32 approximately at the instant of maximum forward velocity. The card will be further accelerated in the scanning unit as described below.

The scanning unit comprises a generally flat table 40 over which the cards pass, with an upstanding side wall 41 against which the reference edge 10 of each card is held as it passes through the unit. For this purpose a rubber-tired driving roller 42 is arranged above the surface of the table at the entrance to the scanning unit mounted on a horizontal axis inclined at a small angle to a true perpendicular from the side wall. This inclination of the driving wheel urges each card up against the side wall 41, as it passes beyond the roller. A slot 43 is formed in the surface of the table transverse to the direction of movement of the cards and in this slot is mounted a sensing unit 44 comprising a row of fifty-five small photo-electric cells 39, spaced from the side wall in positions corresponding to the spacing of the fifty-five possible hole positions in each row on the cards from the reference edge 10 of the cards. In addition there is an "erase" photocell 45 (see FIG. 4) positioned adjacent the side wall 41 to detect any notch 18 in the reference edge of a card, and one further "reset" photocell 46 positioned beyond the limit of the possible hole positions remote from the reference edge, i.e. in the area traversed by the strip 16 on each card.

This last mentioned photocell 46 is used to actuate a gate resetting device, as will be described below. Above this sensing unit there is mounted a strip light 47 spaced to allow the cards to pass between the light and the photocells.

Beyond the sensing unit there is a further rubber-tired roller 48 arranged to drive the cards onwards to a gate which consists of a series of parallel points 49 horizontally pivoted on an axis 150. When the gate is horizontal and flush with the table the cards pass over the gate to an upper chute 151 through which they are delivered to a receiving box 152, and when the gate is lifted the cards pass under the points 49 into a lower chute communicating with a second receiving box 153. The gate is actuated by an electric solenoid controlled by the sensing unit as will be described below.

The points 49 of the gate are spaced from the sensing unit 44 by a distance greater than the length of a card, since the last row of holes in a card may be near its trailing edge 14 and the gate may be actuated by this last row. The feeder unit is arranged to deliver the cards at the rate of 160 per minute to the scanning unit and the first feed-roller 42 in the scanning unit accelerates the cards to produce a space between them slightly greater than the distance between the sensing unit and gate, so ensuring that a card has passed clear of the gate before the gate is reset by the arrival of the leading edge 13 of the next card at the sensing unit, as will be described. The actual speed of the cards past the sensing unit is about 4 feet per second, and this together with the rise and decay time of the photocells determine the minimum permissible spacing of adjacent rows of holes on the cards, which in this case is considerably less than ¼".

The control apparatus used in conjunction with the scanning unit for sorting selected cards from a stack may be of a number of different types depending upon the particular type of information stored on the cards and the particular needs of the user. The present embodiment is designed particularly to segregate from a stack any cards having holes in selected hole positions. For this purpose each of the fifty-five photocells 39 is connected to a high speed switching device so as to render the device either conductive or non-conductive depending upon whether or not light is impinging upon the cell. These high speed switches are arranged in a series circuit and each high speed switch is shunted by an individual manually operated selector switch.

The circuit including the photocells 39 is illustrated in FIG. 5. Each cell 39 is of a type that produces a small current when light falls upon the cell. The cells are connected to a low voltage negative bias line 50 to prevent the cells being actuated by stray light and each cell is connected to the base of a high speed switching transistor 51 whose emitter-collector path is connected across the emitter-base path of a second high speed switching transistor 52. The emitter-collector path of the transistor 52 is shunted by a normally closed manual selector switch 53. The fifty-five switching transistors 52 are arranged in a series circuit, each transistor being in parallel with its associated manual switch 53. When a photocell 39 is dark its associated transistor 51 is switched on and transistor 52 is switched off. When the photocell is exposed to light its associated transistors 51, 52 are switched respectively off and on. It will be noted that the circuit provides a substantially constant drain on the power supply which avoids excessive fluctuations in voltage which might otherwise arise.

The erase photocell 45 is coupled through two high speed transistors 51, 54 to a switching transistor 55 arranged in series with the circuit including the transistors 52. The arrangement is such that when the erase photocell 45 is darkened transistor 51 is switched on, transistor 54 is switched off, and transistor 55 is switched on. Thus it will be seen that if the erase photocell 45 is exposed to light by reason of there being a notch 18 cut in the reference edge 10 of a card the switching transistor 55 will be switching off and the series circuits will be broken preventing any signal being passed onto the gate actuating circuit.

The gate actuating circuit, illustrated generally at 56 in FIG. 5, comprises a gate actuating coil 57 connected between positive and negative terminals 58, 59 through an "Accept" SCR (silicon controlled rectifier) 60, and the arrangement is such that an "Accept" signal on the line 61 causes the "Accept" SCR to condut and thus energizes the coil 57 to move the gate to an "Accept" position. The SCR 60 will remain conducting until switched off and thus acts as an electrical "latch" to hold the gate in this "Accept" position. A terminal 61A may be provided to provide a signal to an "Accept" counter (not shown) and to a test indicator light.

The "reset" photocell 46 is coupled through transistors 62 and 63 to a switching transistor 64 so arranged that transistor 64 is momentarily switched on when the cell 46 is initially darkened. This occurs as the leading edge of each card passes over the sensing unit 44. A pulse is accordingly supplied on line 65 to a "reset" SCR 66 connected in parallel with the "Accept" SCR 60 through the RC circuit shown and this de-energizes the gate actuator coil 57 and switches off the SCR 60. The gate is thus automatically reset to a reject position by the leading edge of each card. A line 67 connected between the transistor 63 and 64 provides a signal to a total card counter. The gate actuating circuit also includes a manual program test switch 68 connected in parallel across the erase switch transistor 55. This in effect overrides the erase photocell and provides means for testing the circuit before a card has been introduced into the scanning unit.

The basic component elements of the sorting unit are illustrated diagrammatically in FIG. 4, in which the direction of card travel is indicated by the arrow 75. As the leading edge of the card passes over the scanning unit it obscures the reset cell 46 which provides the reset signal on line 65 to de-energize the gate actuator coil 57. As the card passes over the scanning unit and each row of punched holes passes over the reading photocells 39 the transistors 52 are switched on and off according to the positions of the punched holes. Selected ones of the manual selector switches 53, which are normally closed, have previously been moved into an open position as illustrated in the two right hand switches of FIG. 5. The circuit through the reading unit will therefore only be completed if all the associated transistors 52 are switched on, i.e. if punched holes appear in these selected positions. If punched holes exist in all the selected positions of one row an "Accept" signal passes to the "erase" switch transistor 55, and provided this transistor is conducting (i.e. there is no corresponding erase notch 18 in the reference edge of the card) the "Accept" signal will be passed on via line 61 to the gate actuator circuit. If the erase notch 18 has been punched in the reference edge of the card, the transistor 55 will of course be switched off and no "Accept" signal will be passed onto the gate actuator so that the gate will remain in its reject position.

The gate actuating mechanism as illustrated in FIG. 6 where the gate actuating coil 57 is wound on a core 76 associated with a moving armature 77 mounted on a pivoted lever 78, the lever being spring urged by a light spring 79 away from the core. The lever carries a roller 80 engaging an arm 81 rigidly secured to a bar 82 attached to the points 49 of the gate, and so arranged that when the armature 77 is attracted towards the core the points 49 are all raised. This is the "Accept" position of the gate in which the cards are passed into the receiving box 153. When the coil 57 is de-energized the armature 77 is returned by the spring 79 and the points 49 of the gate fall rapidly under gravity into their lower "reject" position in which the cards will be delivered into the other receiving box 152.

Alternative control circuitry may be designed to provide widely different sorting characteristics, for example to search for particular combinations of patterns of holes. Moreover the circuit may be designed to enable individual photocells to be used to sense either the presence or absence of a punched hole, or for rendering the photocell inoperative at will. The simple circuit described above is of course only capable of detecting the presence of specific holes; if extra holes are present they will not affect the result, i.e. cards with holes additional to the selected holes will also be "Accepted." This system has certain advantages in particular applications as it enables a family of patterns to be detected but in other applications it may be a disadvantage since it restricts the number of different patterns that can be used in punching the rows.

It is also possible to make a double selection from a stack of cards by placing two such scanning units end-to-end such that the cards delivered through the upper chute of the first scanning unit are passed to the second scanning unit where the second selection is made. The second scanning unit, or both units, includes a compartment under the scanning table which serves as the second receiving box of the preceding unit, and permits the units to be mounted directly end-to-end without any special coupling unit containing a receiving box and an upper chute. Instead of using two such units a single scanning unit may be designed for the same purpose, incorporating two sensing units, and control circuits, and possibly two gates, thus enabling the single unit to sort the cards into three categories.

A punching machine suitable for punching cards in accordance with the invention is illustrated in FIG. 8. The machine comprises a row of fifty-five small punches 89 aligned with punching apertures 98 in a die 99. The card to be punched is fed below a transparent plate 83 so that the card passes below the die. The exact position of the card is determined by the operator at will by use of the row of indexing marks 11 and the danger crosses 12, which appear through the transparent plate 83 and at one side of the die. When the card is in its selected position a shaft 85 is rotated manually causing a cam nose 86 to lift the lever 84 and clamp the card in position. Each punch 89 is associated with a horizontal selector bar 87 movable horizontally on a roller 88. Selector buttons are provided to select the appropriate selector bars 87 and to move these bars to the left in FIG. 8 until their ends are aligned vertically below the respective punches. A shaft 90 is then turned anti-clockwise through a small angle, this shaft being connected to a cam 91 engaging an actuating lever 92 having an upper operating lip 93 aligned with the punches 89. It will be seen that where any particular selector bar 87 has been moved into alignment with one of the punches that punch will be actuated to punch a hole in the card. After the punching operation the shaft 90 is rotated through a further angle in an anti-clockwise direction and the cam 91 engages the lower part of a lever 94 pivoted at 95 and causes a reset nose 96 at the upper end of the lever to push all the selector bars 87 to their right hand position ready for punching the next row of holes. The lever 94 is returned by a spring 97.

What I claim as my invention and desire to secure by Letters Patent is:

1. A method of forming punched cards provided with a graphic record over a part or the whole of one or both surfaces comprising the steps of:
   (1) punching small holes in parallel rows extending transversely across said card where the positions of the holes in the rows represent coded information corresponding to at least a part of the graphic record,
   (2) selecting the positions of the holes in each row from a complete row of available hole positions extending a predetermined intervals transversely across said card, and
   (3) spacing the adjacent rows of holes irregularly and independently of the coded information in accordance with the location of the graphic record on a card so that said rows are positioned in locations where said holes avoid obscuring the graphic record.

2. A method as claimed in claim 1, further comprising the step of forming an aperture adjacent at least one of said rows of holes to indicate that said adjacent row is incorrect.

3. A method as claimed in claim 1, further comprising the preliminary steps of:
   (4) inspecting each card for areas where the graphic record contains detail of small size which might be obliterated or obscured by said punched holes, and
   (5) marking each card in accordance with said inspection to indicate where said rows of holes should not be punched.

4. A punched card provided with areas of graphic record on one or both surfaces, comprising a plurality of punched holes extending over an area coinciding with or overlapping the areas of the graphic record, said holes having a size relatively smaller than the size of the major proportion of the details of the graphic record on the card, said holes are arranged in parallel rows extending transversely across the card and positioned in each row to provide coded information corresponding to at least part of the graphic record on the card, the spacings between adjacent rows of holes are irregular and independent of the coded information, and said rows are positioned so that said holes avoid coincidence with details of the graphic record of such small size as to be capable of being obscured by coincident holes.

5. A punched card as claimed in claim 4, in which the maximum transverse dimension of the holes is less than 2 mm.

6. A punched card as claimed in claim 5, in which the holes are circular and approximately 1.0 mm. in diameter.

7. A punched card as claimed in claim 4 in which the rows all terminate short of one edge to leave an unperforated strip parallel thereto.

8. A punched card as claimed in claim 4 in which each card has a datum reference and the holes are arranged in rows extending perpendicularly to said datum reference.

9. A punched card as claimed in claim 4 in which at least one of said rows is provided with an aperture to indicate information to be erased.

References Cited

UNITED STATES PATENTS 2,055,016    9/1936    Paris _____ 235—61.12

WILLIAM S. LAWSON, Primary Examiner

U.S. Cl. X.R.

234—18, 25, 89, 131; 235—61.12

PO-1050
(5/69)

UNITED STATES PATENT OFFICE
CERTIFICATE OF CORRECTION

Patent No. 3,521,813      Dated July 28, 1970

Inventor(s) Raymond Robert Buckler

It is certified that error appears in the above-identified patent and that said Letters Patent are hereby corrected as shown below:

In the heading, after "Serial No. 577,752", please insert --Claims priority Application Great Britain, September 8, 1965, No. 38389/65--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents